US005725628A

United States Patent [19]
Boulos et al.

[11] Patent Number: 5,725,628
[45] Date of Patent: Mar. 10, 1998

[54] REDUCTION OF NICKEL SULFIDE STONES IN GLASS

[75] Inventors: Edward Nashed Boulos, Troy, Mich.; James Victor Jones, Toledo, Ohio

[73] Assignee: Ford Motor Company, Dearborn, Mich.

[21] Appl. No.: 691,958

[22] Filed: Aug. 5, 1996

[51] Int. Cl.[6] .................... C03B 5/16; C03B 5/18; C03B 5/225
[52] U.S. Cl. .................... 65/134.1; 65/134.3; 65/134.9; 501/70; 501/71
[58] Field of Search .................... 65/134.1, 134.3, 65/139.9; 501/70, 71, 27

[56] References Cited

U.S. PATENT DOCUMENTS

| 29,020 | 7/1860 | Trumbull. | |
|---|---|---|---|
| 1,615,448 | 1/1927 | Frank. | |
| 3,561,985 | 2/1971 | Hagedorn et al. | 106/54 |
| 4,235,634 | 11/1980 | Boyd et al. | 106/52 |
| 5,204,293 | 4/1993 | Amundson Jr. et al. | 501/72 |
| 5,308,805 | 5/1994 | Baker et al. | 501/71 |
| 5,346,867 | 9/1994 | Jones et al. | 501/71 |
| 5,401,287 | 3/1995 | Pecoraro et al. | |
| 5,411,922 | 5/1995 | Jones | 501/71 |
| 5,478,783 | 12/1995 | Higby et al. | 501/27 |
| 5,521,128 | 5/1996 | Jones et al. | 501/27 |

*Primary Examiner*—Donald E. Czaja
*Assistant Examiner*—Jacqueline A. Ruller
*Attorney, Agent, or Firm*—Lorraine S. Melotik

[57] ABSTRACT

The invention is a method of preventing the formation of nickel sulfide stones in soda-lime-silica glass. Nickel compounds are often added as colorants or enter the glass batch as an impurity from raw materials. It involves mixing batch raw materials together, melting and refining them to form a molten glass, the improvement comprising the step of reducing the formation of nickel sulfide stones by adding to the batch materials 0.01–2.0 wt. % of an oxygen containing manganese compound calculated as manganese dioxide. The manganese compound may be a manganese oxide or salts of permanganic acid such as sodium or potassium permanganate.

13 Claims, No Drawings

REDUCTION OF NICKEL SULFIDE STONES IN GLASS

BACKGROUND OF THE INVENTION

Nickel is often included in soda-lime-silica glass as a coloring agent or through impurities present in batch materials. It may also inadvertently be included because stainless steel equipment, which generally contains large amounts of nickel, is often used in mining or handling the batch materials or making the glass. As is well known in the art, the presence of nickel in the glass can lead to the formation of nickel sulfide "stones" which can seriously degrade the quality of the glass. The sulfide comes from sulfates like sodium sulfate which are commonly used as fining agents during glass melting and processing. Normally, in the early stages of glass melting, sodium nitrate is included in the batch to achieve oxidizing conditions under which the sulfate will not convert to sulfide or nickel oxide reduced to nickel. Hence, under oxidizing conditions nickel sulfide stone formation is essentially prevented. The problem arises later in the melting process when conditions may change from oxidizing toward reducing and the sulfate would be reduced to the sulfide or nickel oxide reduced to nickel.

Nickel sulfide stones in glass are usually too small to be seen by the unaided eye and are very difficult to be detected by optical inspection means. The nickel sulfide stones go through a phase change in the glass product over time which is accompanied by a volumetric expansion of about 4%. When this happens, and if the glass product has been tempered, it can experience spontaneous breakage. This may not happen until long after the glass has been installed in a vehicle or in a building. Hence, prevention of nickel sulfide stones is an important objective for glass makers.

Obviously, one of the easiest way to prevent nickel sulfide stone formation is not to use nickel compounds as a coloring component in glass or allow it to enter as an impurity. However, nickel oxide is considered a very effective colorant and for this reason is often used. To avoid nickel sulfide stone formation in glass containing nickel oxide as colorant, Cramer, et. al. in U.S. Pat. No. 3,881,905, disclose complex processing conditions for maintaining an oxidizing environment throughout the glass making process. In U.S. Pat. No. 4,919,698, Knavish suggests another approach which comprises electrically imposing oxidizing conditions near the bottom of the furnace. It would be commercially valuable if glass makers could use nickel as a coloring component in glass without having to employ complex processing to avoid nickel sulfide stone formation. To avoid nickel sulfide stone formation in glass compositions in which nickel is not to be used as a colorant, glass companies typically specificy that their raw materials be free of nickel compounds. And raw material suppliers attempt to avoid using stainless steel equipment in mining or handling the raw materials to preclude nickel contamination from the stainless steel. Glass makers too are cautious about the use of stainless steel equipment in their glass manufacturing to avoid nickel getting into the glass. Even with all these precautions, nickel sometimes still finds its way into the glass composition. In U.S. Pat. No. 5,401,287, Pecoraro, et. al. suggest that one way to limit the number of nickel sulfide stones is by adding to the raw batch charge one material from among the group consisting of molybdenum, arsenic, antimony, bismuth, copper, silver, potassium dichromate, and iron chromite. All of the above materials are expensive, however, and some of the materials such as the copper oxides and the chrome containing materials can color the glass even when used in small quantities. It would be desirable to have a less costly and more desirable way to reduce the formation of nickel sulfide stones when nickel is present in the glass materials either as a colorant or as an impurity. The present invention provides such a solution.

SUMMARY OF THE INVENTION

The present invention is a method of reducing the formation of nickel sulfide stones during manufacturing of soda-lime-silica glass having nickel compounds added as a component of the glass batch or entering as an impurity as with the batch raw materials. It involves mixing batch raw materials together, melting and refining them to form a molten glass, the improvement comprising the step of reducing the formation of nickel sulfide stones by adding to the batch materials 0.01–2.0 wt. % of an oxygen containing manganese compound calculated as manganese dioxide. Exemplary of the oxygen containing manganese compound manganese oxide or sodium or potassium permanganate. If iron (as $Fe_2O_3$) is present in the glass, the weight ratio of the manganese compound as calculated as $MnO_2$ to $Fe_2O_3$ is desirably less than 6 to 1.

Advantageously, oxygen containing manganese compounds are all strong oxidizers and thus they have the distinct advantage over conventional oxidizers like sodium or potassium nitrates in that these manganese compounds maintain their oxidizing effect in the glass at temperatures much higher than that of the nitrates. Manganese dioxide, as one example, is relatively inexpensive as a glass batch material and maintains the oxidizing conditions throughout the glass making process. It has been found according to this invention that the manganese compounds can be use to replace all or some of these conventional oxidizing materials.

Much prior literature has taught that manganese compounds should not be added to glass compositions because it causes the glass to discolor ("solarize") upon exposure to UV light. We however found that manganese compounds can be used without causing solarization. If iron oxide (as $Fe_2O_3$) is present in the glass, we have found that desirably maintaining a ratio of 6/1 or less of an oxygen containing manganese compound calculated as $MnO_2/Fe_2O_3$ prevents solarization.

DESCRIPTION OF PREFERRED EMBODIMENTS

Typical soda-lime-silica float glass may be characterized by the following composition on a weight percent basis of the total glass: 68–75% $SiO_2$, 10–18% $Na_2O$, 5–15% CaO, 0–10% MgO, 0–5% $Al_2O_3$, and 0–5% $K_2O$. When nickel is present as a tramp material, it is usually in very small amounts generally less than 0.002 wt. %. When nickel is purposely added to be a colorant for the glass, then the amount is generally greater than 0.002 wt. % as Ni. The batch materials combined to produce this glass typically include sand, soda ash, dolomite, limestone, sodium nitrate or nitrite, carbocite, and gypsum or salt cake ($Na_2SO_4$). As would be appreciated by those skilled in the art, processing aids like the carbocite are added to maintain the proper balance of redox conditions. For example, carbocite when added to the glass composition has the effect of reducing colorants like iron oxide to achieve lower infrared transmittance, i.e., reducing $Fe_2O_3$ to FeO.

In the invention method, the batch materials would be added into a typical glass melting furnace and fired to melt the components forming molten glass. The oxygen containing manganese compound may be added along with the initial batch materials or added somewhat later during melting, depending on whether other oxidizing agents like sodium nitrate have been added. If it has, the manganese compound can be added later. It is preferred to use mostly or all of the oxygen containing manganese compounds as the oxidizing agents since they maintain their oxidizing ability throughout the entire melting process and hence reduce the formation of nickel sulfide stones in the glass melt. Preferably; it is desirable to add the manganese compound into the melt with the other batch materials.

The oxygen containing manganese compound is added to the melt components in an amount of 0.01–2.0 wt. % calculated as manganese dioxide based on the total weight of batch materials. Preferably, the amount added is at least 0.02 wt. % of the total weight of batch materials. The amount of manganese compound to be added into the batch will be determined by the color of the glass product. As the glass transmittance is lowered more manganese dioxide can be added to the batch with a minimal affect to the color. By "oxygen containing manganese compound" in this invention is meant a manganese compound which includes oxygen (O) in its chemical formula. Such compound include, for example, oxides of manganese like manganese dioxide ($MnO_2$) or manganous oxide ($Mn_2O_3$); or salts of permanganic acid like sodium permanganate or potassium permanganate; carbonates like manganese carbonate, etc. It is preferred that the manganese compound be added in as $MnO_2$ because more oxygen is available than with $Mn_2O_3$. The manganese compound may be added into the batch in the form of a partially refined ore like pyrolusite which contains manganese dioxide. Another way it can be added to the batch is as a component of a processed material, one example being Brickox™ from Prince Manufacturing Company. In this processed material, the manganese compound present is about 78% $MnO_2$. Using a process material like this is useful because the cost of $MnO_2$ on a per pound basis is cheaper. However, any oxygen containing manganese compound incorporated into the glass during melt processing will provide the benefit of the invention in reducing nickel sulfide stone formations.

Generally, glasses made by the float process include iron oxide in some amount, the higher the amount the darker the glass. Iron oxide is often included in commercial glass like automotive or architectural glass because it has the ability to block some of the ultraviolet and infrared radiation from passing through the glass. For example, in U.S. Pat. Nos. 5,346,867 and 5,521,128 filed by the present inventors and commonly assigned with the present invention, we disclose that in a high iron neutral gray glass manganese dioxide can be added to increase the retention of selenium, a colorant prone to vaporize out of the composition. We have found, according to one aspect of the present invention, that if iron oxide is included as a colorant in the glass, the ratio of the oxygen containing manganese compound (calculated as $MnO_2$) should desirably not exceed six times the iron oxide(calculated as total $Fe_2O_3$). We have found that above this level, solarization (discoloration) of the glass may take place when it is exposed for a significant time to UV radiation as from sunlight. In the art, manganese is well known to cause solarization in glasses containing iron oxide. Solarization involves chemical reactions in the glass that take place upon UV exposure, one reaction is the shift of $Fe^{+3}$ toward $Fe^{+2}$. As the iron moves from the oxidized species ($Fe_2O_3$) to the reduced species (FeO) it is accompanied by an undesirable color shift toward blue in the glass product.

Advantageously, we have found that oxidizing conditions can be maintained throughout the glass making process by using oxygen containing manganese compounds in the glass batch. By maintaining these oxidizing conditions, the formation of nickel sulfide stones can be reduced or prevented. We have found that manganese compounds when included in the molten batch according to this invention continue to provide a source of oxygen in the glass melt throughout the glass making process. As compared to the Pecoraro's '287 invention, the present invention uses manganese compounds which themselves provide the oxygen to maintain the oxidizing conditions in glass batch. Manganese compounds are much cheaper as compared to the materials suggested in '287 for reducing nickel sulfide stone formation. In addition, advantageously we have found that manganese compounds tend to not color the glass by solarization unless the glass is very low in iron oxide. And adding the very large amounts of manganese, necessary to act as a colorant for the glass, are much greater than those envisioned in the presently disclosed invention.

We formulated several glass samples according to embodiments of the present invention to show the reduction of nickel sulfide stones when oxygen containing manganese compounds are added into the glass during melt processing. In addition, in the tables below we show the impact on physical properties like color (wavelength) or excitation purity of these samples by inclusion of manganese compounds. In particular, Table I lists six glass compositions according to the present invention and shows the color shift (based on the dominant wavelength) after the samples were subjected to an accelerated 1500 hour exposure in an Atlas, Model Ci65 Weather-ometer using a Xenon UV lamp. This 1500 hour exposure is about equivalent to the sun in Arizona for 3 years.

TABLE I

|  | Original Dominant Wavelength in nm. | Exposed 1500 hours | Difference |
| --- | --- | --- | --- |
| Ex. 1:<br>0.1 wt. % $Fe_2O_3$, 0.2 wt. % $MnO_2$ | 556.6 | 543.7 | −12.9 |
| Ex. 2:<br>0.3 wt. % $Fe_2O_3$, 0.2 wt. % $MnO_2$ | 520.1 | 569.4 | −10.7 |
| Ex. 3:<br>0.6 wt. % $Fe_2O_3$, 0.2 wt. % $MnO_2$ | 514.1 | 511.6 | −2.5 |
| Ex. 4:<br>0.1 wt. % $Fe_2O_3$, 0.6 wt. % $MnO_2$ | 570.6 | 598.7 | −28.1 |
| Ex. 5:<br>0.3 wt. % $Fe_2O_3$, 0.6 wt. % $MnO_2$ | 559.5 | 561.0 | +1.5 |
| Ex. 6:<br>0.6 wt. % $Fe_2O_3$, 0.6 wt. % $MnO_2$ | 553.5 | 553.8 | +0.3 |

In Table II below, the same six samples were evaluated for changes in excitation purity. Table II below shows the difference in the % excitation purity before and after 1500 hour of exposure to the Xenon light above. The 1500 hour exposure under the severe conditions of the Xenon light represents about 3 years of real time exposure in Arizona.

The small change to the % excitation purity in Examples 1 and 2 is not considered significant and coupled with the low original % excitation purity for Examples 1 and 2, the color shifts are not considered to have any practical impact on color. Examples 1, 2, and 4 all show a shift in the color based on the dominant wavelength alone; however, Example 4 is the only glass sample to show a meaningful change in color once the change in % excitation purity is examined. Example 4 is considered to have made a significant color change under the strong ultra violet exposure and is determined to be "solarized". Therefore, if the molar ratio of $MnO_2/Fe_2O_3$ is 6/1 or greater then we would expect the glass to have the potential to become solarized and this 6/1 ratio should not be exceeded for those glass expected to be used exposed long term to UV light. Data from Tables I and II suggest that a 3/1 molar ratio of $MnO_2/Fe_2O_3$ would be most acceptable to avoiding a color change during use of the glass. In other applications, it may be even desired to keep the ratio of $MnO_2/Fe_2O_3$ to less than 3/1. That is, at low concentrations of $Fe2O3$, glasses of the invention would have a greater tendency to solarize when the MnO2/Fe2O3 goes above a 3/1 molar ratio.

TABLE II

| | Original Excitation nm. | Exposed 1500 hours | Difference |
|---|---|---|---|
| Ex. 1: 0.1 wt. % $Fe_2O_3$, 0.2 wt. % $MnO_2$ | 0.6 | 0.2 | −0.4 |
| Ex. 2: 0.3 wt. % $Fe_2O_3$, 0.2 wt. % $MnO_2$ | 0.7 | 0.6 | −0.1 |
| Ex. 3: 0.6 wt. % $Fe_2O_3$, 0.2 wt. % $MnO_2$ | 1.4 | 1.4 | 0.0 |
| Ex. 4 0.1 wt. % $Fe_2O_3$, 0.6 wt. % $MnO_2$ | 1.7 | 0.5 | −1.2 |
| Ex. 5: 0.3 wt. % $Fe_2O_3$, 0.6 wt. % $MnO_2$ | 2.3 | 1.4 | −0.9 |
| Ex. 6: 0.6 wt. % $Fe_2O_3$, 0.6 wt. % $MnO_2$ | 3.5 | 3.1 | −0.4 |

The '287 Pecoraro, et. al. patent mentioned above describes in column 3 lines 15–25 a procedure to generate nickel sulfide stones in laboratory melts and using Pecoraro's melting schedule we made laboratory melts to demonstrate the improvement in reducing nickel sulfide stones created when manganese dioxide is used in a batch prone to the formation of nickel sulfide stones. Our test results, given in Table IV below, show that we lower the incidence of nickel sulfide stones significantly when using additions of manganese dioxide to the batch. Table III shows the base batch melt components, without additives, based on weight in grams:

TABLE III

| | |
|---|---|
| Sand | 500 |
| Soda Ash | 73 |
| Dolomite | 121 |

TABLE III-continued

| | |
|---|---|
| Limestone | 45 |
| Salt Cake | 7.5 |
| Rouge (green glass only) | 3.6 |
| Nickel powder | 0.5 |

Test results of melts made in the same manner as Pecoraro '287 using the base glass batch from Table III are listed in Table IV and these results readily demonstrate the ability of manganese dioxide to suppress the formation of nickel sulfide stones:

TABLE IV

| Additive | Number of nickel sulfide stone per melt |
|---|---|
| Standard, no additive, no rouge | 64 |
| 0.1 wt. % $MnO_2$, no rouge | 25 |
| 0.4 wt. % $MnO_2$, no rouge | 5 |
| 0.4 wt. % $MnO_2$, with rouge | 0 |

From Table IV it can be seen that when 0.1 wt. % $MnO_2$, the ratio of $MnO_2/Ni$ is 1–4, is added to the batch, a significant drop in the number of nickel sulfide stones occurs. As $MnO_2$ is increased to the 0.4 wt. % level, the formation of the nickel sulfide stones is further reduced. It can be seen that the addition of rouge, $Fe_2O_3$, lowers the propensity of the glass to form nickel sulfide stones. This result is consistent with the fact that $Fe_2O_3$ is the oxidized species of iron oxide. Rouge typically contains about 93–97 wt. % $Fe_2O_3$ with less than 1.0 wt. % FeO (the reduced species). During glass manufacturing, the proportion of FeO increases in the melt to 20–30% of the iron oxide total and this also generates oxygen which helps to prevent nickel oxide stones from forming. It is not desirable to include rouge solely for the purpose of preventing nickel sulfide stone formation, however, since even relatively small amounts of iron oxide significantly color the glass.

Because manganese dioxide is a weak colorant, it can advantageously be used to prevent nickel sulfide stones without significantly affecting the color of the glass which might be provided by colorants like cobalt oxide or selenium. In this discussion, manganese dioxide is meant to be exemplary of any oxygen containing manganese compound which may be so employed. Being a weak colorant, manganese dioxide can be used in relatively large quantities, particularly when colorants like cobalt oxide are also included in large amounts, without impacting the desired color. Typically as the colorant concentration in the glass increases, the light transmittance of the glass will be lowered which aids in masking any color impact by the manganese dioxide. Thus as the nickel colorant concentration is increased so too can the concentration of manganese dioxide be increased to prevent the formation of nickel sulfide stones without this added manganese dioxide significantly affecting the desired optical properties of the glass products. Hence, this feature of manganese dioxide as a weak colorant is important for the present invention method.

We claim:

1. In a method of manufacturing soda-lime-silica glass where the raw materials are mixed together, melted and refined to form a molten glass and nickel compounds being added as a component of said batch or being present as an impurity therein and capable of forming nickel sulfide stone defects, the improvement comprising the step of reducing the formation of nickel sulfide stones by adding oxygen containing manganese compound calculated as manganese dioxide to said batch materials in an amount of 0.01–2.0 wt. % sufficient to reduce the formation of nickel sulfide stones, the ratio of manganese dioxide being at least 1.4 times by weight the amount of nickel present in the glass.

2. The method according to claim 1 wherein said manganese compound comprises at least 0.02 wt. % of said batch materials.

3. The method according to claim 1 wherein said manganese compound is added to said batch materials in the form of an oxide.

4. The method according to claim 3 wherein said manganese compound is added to said batch materials as manganese dioxide, $MnO_2$.

5. The method according to claim 1 wherein said sodium permanganate or potassium compound is added in the form of manganese permanganate or manganese carbonate.

6. The method according to claim 1 wherein said manganese compound is added as component of a partially refined ore.

7. The method according to claim 1 wherein said manganese compound is added as component of a processed material.

8. The method according to claim 1 wherein said batch materials includes sand, soda ash, limestone, dolomite, and salt cake.

9. The method according to claim 1 wherein said batch materials includes sand, soda ash, limestone, dolomite, and gypsum.

10. The method according to claim 1 wherein said batch materials includes nitrates or nitrites.

11. The method according to claim 1 wherein said batch materials include iron oxide so that the molar ratio of said oxygen containing manganese compound calculated as $MnO_2$ to the iron oxide calculated as $Fe_2O_3$ does not exceed 6/1.

12. The method according to claim 1 wherein a nickel containing compound is added in as a component of said batch.

13. The method according to claim 1 wherein said soda-lime-silica glass is 68–75 wt. % $SiO_2$, 10–18 wt. % $Na_2O$, 5–15 wt. % CaO, 0–10 wt. % MgO, 0–5 wt. % $Al_2O_3$, and 0–5 wt. % $K_2O$.

* * * * *